United States Patent [19]

Matsubara

[11] Patent Number: 5,148,295
[45] Date of Patent: Sep. 15, 1992

[54] INFORMATION PROCESSING APPARATUS

[75] Inventor: Jun Matsubara, Kanagawa, Japan

[73] Assignee: Kabushiki Kaisha Toshiba, Kanagawa, Japan

[21] Appl. No.: 733,964

[22] Filed: Jul. 22, 1991

Related U.S. Application Data

[63] Continuation of Ser. No. 441,448, Nov. 27, 1989, abandoned.

[30] Foreign Application Priority Data

Nov. 30, 1988 [JP] Japan ............................ 63-303680

[51] Int. Cl.⁵ .......................................... H04N 1/387
[52] U.S. Cl. .................................. 358/451; 358/449; 358/497; 358/498
[58] Field of Search ............... 358/401, 405, 449, 451, 358/474, 488, 496, 497, 498, 452, 453

[56] References Cited

U.S. PATENT DOCUMENTS

| | | | |
|---|---|---|---|
| 4,598,323 | 7/1986 | Honjo et al. | 358/496 |
| 4,701,808 | 10/1987 | Nagashima | 358/451 |
| 4,733,304 | 3/1988 | Homma et al. | 358/452 |
| 4,899,227 | 2/1990 | Yamada | 358/449 |

FOREIGN PATENT DOCUMENTS

| | | | |
|---|---|---|---|
| 58-151771A | 9/1983 | Japan | 358/451 |
| 58-182951A | 10/1983 | Japan | 358/451 |
| 2100093A | 12/1982 | United Kingdom | 358/451 |

Primary Examiner—Edward L. Coles, Sr.
Assistant Examiner—Jerome Grant, II
Attorney, Agent, or Firm—Finnegan, Henderson, Farabow, Garrett and Dunner

[57] ABSTRACT

An information processing apparatus including an image scanner, on which original documents with any vertical or horizontal format are placed, for optically scanning the images of the original documents to generate output image information and format setting keys for designating the format of the original documents and generating information concerning the format of the original documents. The apparatus further includes a first memory for storing the information concerning the format of the original documents generated by the format setting keys and for outputting the information concerning the format; an enlargement/reduction unit for changing the size of the image information of a whole vertical original document and a whole horizontal original document output from the image scanner with the same magnification and for outputting the changed image information; a second memory for storing the image information output from the enlargement/reduction unit in accordance with the information concerning the format of the original documents output from the first memory and for outputting the image information; and a display unit having a square screen for displaying the image information from the second memory on the square screen.

5 Claims, 4 Drawing Sheets

INFORMATION PROCESSING APPARATUS

This application is a continuation of Ser. No. 07/441,448 filed Nov. 27, 1989 now abandoned.

BACKGROUND OF THE INVENTION

1. Field of the Invention

The present invention relates to an information processing apparatus which displays image information in either a vertical or horizontal format to produce an appropriate display in the format of the original document.

2. Description of the Related Art

In recent years, various information processing apparatuses have been proposed which are designed to read sequentially a large number of prints consisting of various original documents using an image scanner device and to store them in a memory device, such as an optical disc unit, as image information. At the same time, they are designed to retrieve stored image information when required and to output it to a printer or display unit.

The display unit used in this type of prior art information processing apparatus is designed to display the image information directly on a display unit of an original document read by an image scanner, using either a so-called vertical display format unit, which has a length in the vertical direction of 17 inches and which is longer than the width in the horizontal direction, or a so-called horizontal display format unit, which has width in the horizontal direction of 17 inches, and which is longer than the length in the vertical direction.

In earlier information processing apparatus that used a vertical display device, if the original document read by the image scanner was in the so-called vertical format (having a width smaller than the vertical length), i.e., when the original document was produced in the vertical state, it could be displayed as it stood. However, if the original document was in the so-called horizontal format (having a width larger than the vertical length of the vertical i.e., when the original document was produced in the horizontal state, the image information read from this horizontal original document sometimes could not be displayed on the display unit as it stood. In such cases, the image information read from the horizontal original document was displayed on the vertical display format unit using a reduction process. This reduced display size was a problem.

Also, in the same way, in information processing apparatuses used a horizontal display format unit, if the original document read by the image scanner was in the vertical format, the image information read from this vertical original document was displayed on the horizontal display format unit using a reduction process. This created problems in reading the image information on the display screen.

SUMMARY OF THE INVENTION

It is an object of the present invention to provide an information processing apparatus which appropriately displays image information read from any original document format, such as vertical or horizontal, in the format of the original document.

According to the present invention, an information processing apparatus comprises means for inputting image information and format information from an original document having either a vertical format of which width smaller than the length of the vertical side or a horizontal format of which width larger than the length of the vertical side, means responsive to the format information for modifying the input image information to change the size of the input image using a constant magnification for original documents having either a vertical or horizontal format, and means for displaying the modified input image information.

DESCRIPTION OF THE PREFERRED EMBODIMENT

A preferred embodiment of the present invention will now be described in more detail with reference to the accompanying drawings.

Figure 1:
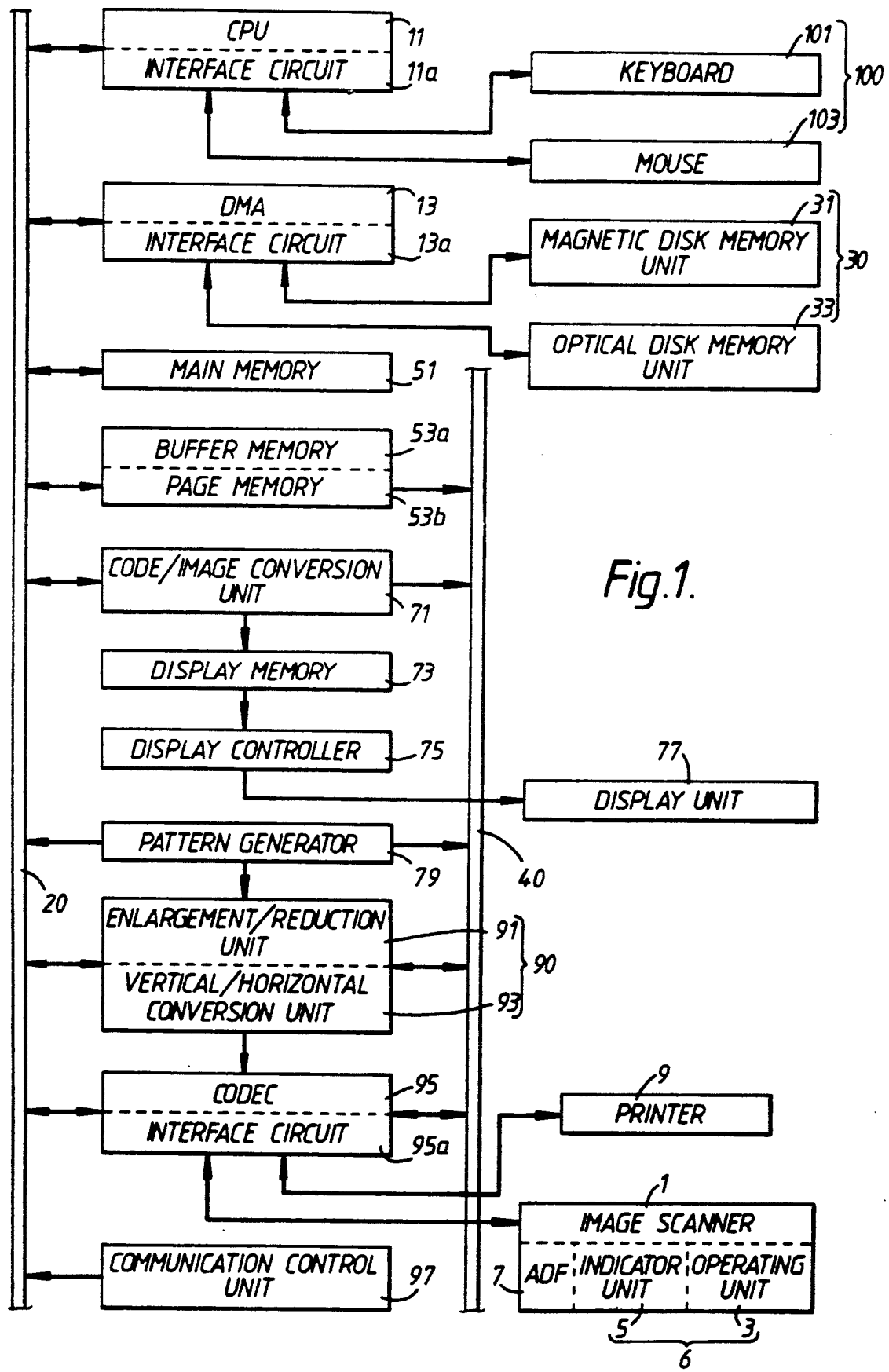
FIG. 1 is a block diagram showing the overall configuration of one embodiment of the present invention.

The overall construction of an image information storage/retrieval apparatus is described, with reference to FIG. 1, which illustrates en information processing apparatus to which the present invention is applied. Image scanner 1 is an input device and has a reader including a CCD image sensor and a light source, for example, a laser. Image scanner reads the printed content of original documents such as photographs or other types of documents as image data by optical scanning the image of the original documents. Image scanner 1 includes operating unit 3 for establishing parameters, such as size of the original document to be read, darkness of the original document and density to be read: a memory (not shown) for storing the established parameters in a CPU (not shown) for executing control of the whole of image scanner 1; indicator unit 5 for indicating input information such as the setting conditions and an processing time; and ADF (Automatic Document Feeder) 7 for executing the reading of original documents by successively transporting original documents which have been placed on an original document table (not shown) to the reader station.

Operating panel 6 of image scanner 1 includes operating unit 3 and indicator unit 5.

Figure 4:
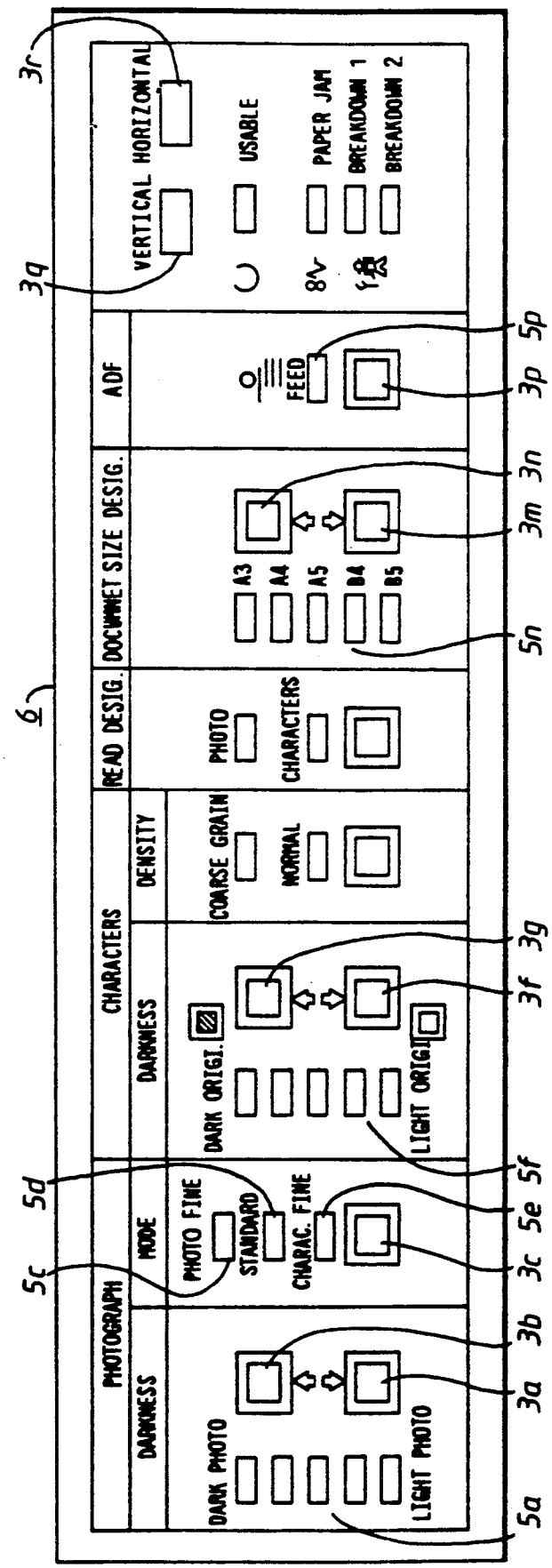
FIG. 4 is a plan view showing a operating panel.

FIG. 4 shows operating panel 6. Photograph darkness setting keys 3a and 3b are keys for setting the darkness reading for photograph areas. The darkness set by the operation of these keys is indicated in five stages by indicators 5a. Mode shift key 3c is a key for designating shifting within the photograph reading mode for "Photograph Fine", "Standard" and "Character Fine". The designated mode shifts are indicated by indicators 5c, 5d and 5e, respectively. Character darkness setting keys 3f and 3g are keys for setting the darkness reading for character areas, and the darkness set by the operation of these keys is indicated in five stages by indicators 5f. Original document size designator keys 3m and 3n are keys for designating original document size, and the designated original document size is indicated by indicators 5n. Automatic document feed key 3p is a key for selecting automatic document feed, and indicator 5p lights when automatic document feed is operating. Vertical setting key 3q is operated when reading a vertical original document. Horizontal setting key 3r is operated when reading a horizontal original document.

Image scanner 1 can read the image information of original documents with any format such as vertical or horizontal in response to the format of the original document which is placed on the original document table. For instance, when character information for an A4 size original document in the vertical format is entered into the control panel, this original document is placed on the original document table in the vertical format, and the original document is transported and sequentially read in the vertical direction. At this time, information concerning the original document format is input by operating unit 3. That is, vertical setting keV 3q of the operating unit 3 is pressed by the operator.

Returning to FIGURE 1, DMA (Dynamic Memory Access) 13, main memory 51, buffer memory 53a, page memory 53b, code/image conversion unit 71, display memory 73, IPU (Image Processing Unit) 90 and CODEC (Coder-Decoder) 95 are respectively connected to CPU 11 via system bus 20.

Buffer memory 53a, page memory 53b, code/image conversion unit 71, display memory 73, IPU 90 and CODEC 95 are respectively connected to CPU 11 via system bus 20 for image information transmission.

CPU 11 controls the overall operation of the information processing apparatus and the data flow via system bus 20 and image bus 40.

Also, keyboard 101 and mouse 103 are connected to CPU 11 via interface circuit 11a. Mouse 103 is used for vertically or horizontally moving a cursor (not shown) on a display window of display unit 77, and for selecting or entering the command indicated by the cursor. For example, the operating mode of the apparatus, the region designation for image edition, and icons are selected by use of mouse 103. Input device 100 comprises keyboard 101 and mouse 103 and, for instance, character information is input through this input device 100 when executing document production using a word-processing function. When executing retrieval and image processing, cursor shifts which are displayed on the display screen of display unit 77, retrieval information for executing the various function changing, various command information, and layouts are input through this input device 100.

Information concerning the original document format read by image scanner 1 are input from keyboard 101. The information concerning the original document format input by keyboard 101 is output to main memory 51 via interface circuit 11a and system bus 20.

DMA 13 is connected, via interface circuit 13a, to memory device 30 which includes a magnetic disc memory unit 31 and an optical disc memory unit 33. DMA 13 executes data transfers between buffer memory 53a and memory device 30 via interface circuit 13a independent of the operation of CPU 11.

Magnetic disc memory unit 31 stores retrieval information, such as the information specifying the desired image information from information on a large number of images.

Optical disc memory unit 33 stores information on a large number of images and the retrieval information corresponding to the information for each individual image.

Main memory 51 stores the operating programs for CPU 11. Also, main memory 51 has an area for storing information concerning the formats of original documents read by image scanner 1, and sequentially stores information concerning the formats of original documents output from operating unit 3 or keyboard 101.

Buffer memory 53a has, for instance, a 128 kilobyte memory capacity, and sequentially stores coded data in which any redundancy has been compression processed by CODEC 95. Also, a counter for counting the stored data volume is provided in buffer memory 53a. When, based on the count of this counter, the stored data volume reaches, for instance, more than half of the memory capacity, i.e., when more than 64 kilobytes of code data is stored, these 64 kilobytes of data are fed by word units to optical disc memory device 33 via system bus 20 and interface circuit 13a.

Page memory 53b has a storage capacity capable of handling, for instance, several 10s of pages of A4 size original documents, and temporarily stores information such as image information input from image scanner 1 or image information retrieved from optical disc memory devices 33.

Code/image conversion unit 71 outputs character code data input from, for instance, keyboard 101, to display memory 73 by converting these data to image data. Also, code/image conversion unit 71 executes reverse conversion when required, for example in correction of characters that have been converted to image data on the display screen, code/image conversion unit 71 converts the converted image data into character code data.

Display memory 73 is a memory for temporarily storing image information and, when displaying an image based on image information from page memory 53b in display unit 77, for temporarily storing this image information.

Display controller 75 executes drive control of display unit 77, and executes control concerning the display of the image information stored in display memory 73.

Display unit 77 displays the original document image information read by image scanner 1 in the format of the original document. The display screen of display unit 77 is a square with 19-inch sides. If the size of two original documents is the same but these formats are different, for example, one vertical format and one horizontal format, the image information of either vertical original documents or horizontal original documents can be displayed using the same magnification. For instance, the image information of an A4 size vertical original document can be displayed as image information with a magnification of 1. The image also be displayed as image information with a magnification of 1.

Pattern generator 79 stores pattern information such as characters or symbols.

CODEC 95 is a coding/decoding circuit, and is designed to conserve the memory areas of memory media, such as the optical disc, by compression processing, i.e., reduction of redundancy of the image information. Also, CODEC 95 outputs the original image information by expanding the image information which has been compression processed.

IPU 90 is connected to CODEC 95. IPU 90 houses enlargement/reduction unit 91, which executes the enlargement and reduction of image information, and vertical/horizontal conversion unit 93, which executes the rotation of the image information.

Enlargement/reduction unit 91 has a reduction processing means (not shown) for direct reduction processing of the image information read by image scanner unit 1. This reduction processing means houses a product sum operation circuit, and executes reduction processing on data to be reduced that is composed of a specified number of bits in which black bits or white bits are arrayed in a lattice shape in the X axis direction and Y axis direction. That is, the reduction processing means sets a point bit for the execution of the weighted operation of reduction processing at every data to be reduced. Next, making the value of the point bit "1", the respective products of this point bit value "1" and the reciprocals of the distance to the black bits that are present around the point bit are calculated. Then, the total sum of these products is calculated by the product sum operation circuit. The value calculated by this product sum operation circuit is compared with a specified reference value by a comparator circuit (not shown). This is output from the comparator as a signal corresponding to 1 bit of a picture element formed by reducing the data to be reduced.

The operation of this type of reduction processing means may be executed based on a control program housed in main memory 51.

Also, the value of the reduction factor which is used by the reduction processing means can be designated as an appropriate value by a control table stored in main memory 51 or by data input device 100.

Input and output devices such as image scanner 1 and printer 9 are also connected to interface circuit 95a.

Printer 9 is an output device for printing image information as visible information, such as characters, on recording media, such as paper, and, for instance, a laser beam printer or the like may be used.

Communication control unit 97 executes communication with external systems or a LAN (Local Area Network) control system (not shown). For instance, communication control unit 97 transmits image retrieval request signals and retrieval information from external systems to CPU 11 and, at the same time, outputs retrieval information to the external systems.

Examples of the reading of a large number of original documents, the registration of the image information formed in these original documents, and the retrieval and printing-out of an image will next be described.

First, in the case of the registration of image information, the original document is read by inputting the commands for executing the reading of the original document. The continuous registration of the image information which is read in specified optical disc memory unit 33 is input from keyboard 101, and the image information storage/retrieval apparatus is thus set into a "Read and Register" mode.

Next, a large number of original documents are piled up in a specified position, such as the original document table of image scanner 1, which forms part of this image information storage/retrieval apparatus. Then, after setting the "Automatic Document Feed" mode for continuous reading of the original documents, information concerning initial settings, such as document size, document darkness and reading density, is input from keyboard 101 or operating unit 3 of image scanner 1.

Moreover, the image information from image scanner has been temporarily stored in page memory 53b. Then the image information is transmitted to optical disc memory unit 33 via buffer memory 53a and interface circuit 13a so that it can be registered on the optical disc (not shown) which is the memory medium of optical disc memory unit 33. Next, using keyboard 101, retrieval information, such as the title, amount of information and layout of the original document for registration, is input according to the format displayed on the screen of display unit 77. This format is the input setting of such entries as the key entries for making retrieval processing simple by specifying the original document to be registered. Various information such as the remaining capacity of memory device 30 when reading the original document by image scanner 1, tables for input use such as the key entries for retrieval use, and the functions of the function keys which are part of keyboard 101 and used when inputting, are displayed.

When reading of the original document commences, image information read from scanner 1 is temporarily stored in page memory 53b via interface circuit 95a. Then, after CODEC 95 has compressed the image information, the retrieval information is stored in magnetic disk memory unit 31 to be registered via buffer memory 53a and interface circuit 13a and, at the same time, the retrieval information and the image information are stored in optical disc memory unit 33 to be registered.

In the case of retrieving specified image information from among the large volume of image information, which has been registered in optical disc memory unit 33, the "Retrieval" mode is set by inputting the retrieval command using keyboard 101, in the same way as in the case of reading and registering.

Next, the desired retrieval information from among the large volume of retrieval information which has been stored in magnetic disc memory unit 31 is selected by inputting the retrieval information for specifying the desired image information using keyboard 101. Based on this selected retrieval information, the desired image information registered in optical disc memory unit 33 is retrieved. Image information retrieved in this way is supplied from optical disc memory unit 33 to CODEC 95 via interface circuit 13a and buffer memory 53a. CODEC 95 decodes the retrieved image information by executing expansion processing, then the retrieved image information is displayed on display unit 77 via display memory 73.

When a hard copy of this displayed image information is required, printer 9 executes a print operation designating the desired image information for the hard copy using keyboard 101 and setting the number of output pages, etc.

Figure 2A:
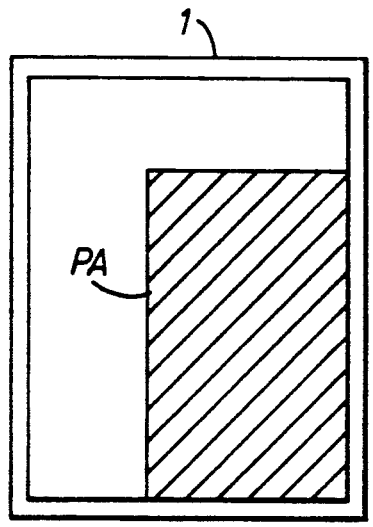
FIG. 2A is an illustration showing a vertical format original document read by an image scanner.

Next, the operation of the invention will now be described with reference to FIGS. 2 and 3. When, for instance a vertical original document PA such as shown in FIG. 2A is read by image scanner 1 and displayed on square display unit 77 is described, operation proceeds as described below.

First, vertical original document PA is placed on the original document table of image scanner 1. Next, information to the effect that original document PA is in vertical format is input by vertical setting key 3q of operating unit 3 or keyboard 101. The information concerning the format of this original document PA is stored in main memory 51.

Figure 3A:
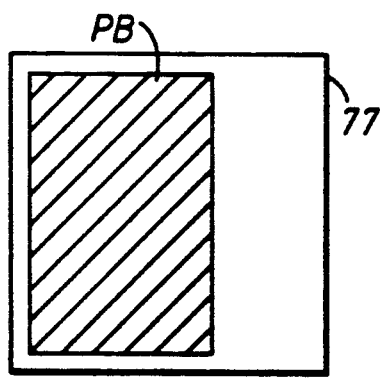
FIG. 3A is an illustration showing the image information displayed by a display unit for the vertical format.

When image scanner 1 begins reading original document PA, the image information read from original document PA is sequentially transmitted to display memory 73 via interface circuit 95a and system bus 20. Under the control of CpU 11, display memory 73 sequentially stores the image information input from image scanner 1 in a vertical format in response to the information concerning the format from main memory 51. Image information stored in the vertical format in this way is supplied to display unit 77 via display control unit 75. This approximately square display unit 77 displays the image information PB of original document PA in the vertical format, as shown in FIG. 3A.

Figure 2B:
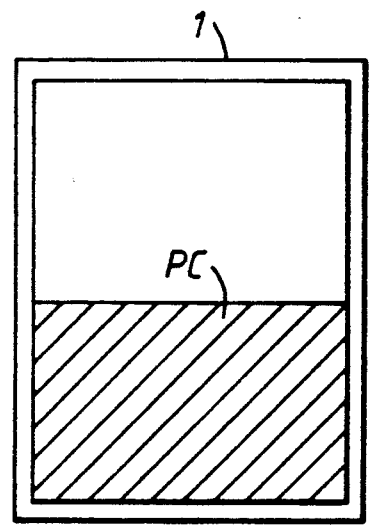
FIG. 2B is an illustration showing a horizontal format original document read by the image scanner.
Figure 3B:
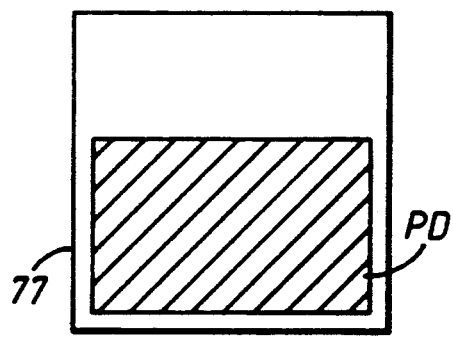
FIG. 3B is an illustration showing the image information displayed by the display unit for the horizontal format.

Next, the operation for a horizontal original document PC, such as shown in FIGURE 2B, read by image scanner 1 and displayed on display unit 77 is described. The image information of original document pC read by image scanner 1 is sequentially transmitted to display memory 73, as described above. Display memory 73 sequentially stores this image information in a horizontal format. Square display unit 77 displays the image information PD of original document PC in the horizontal format, as shown in FIG. 3B.

Figure 5:
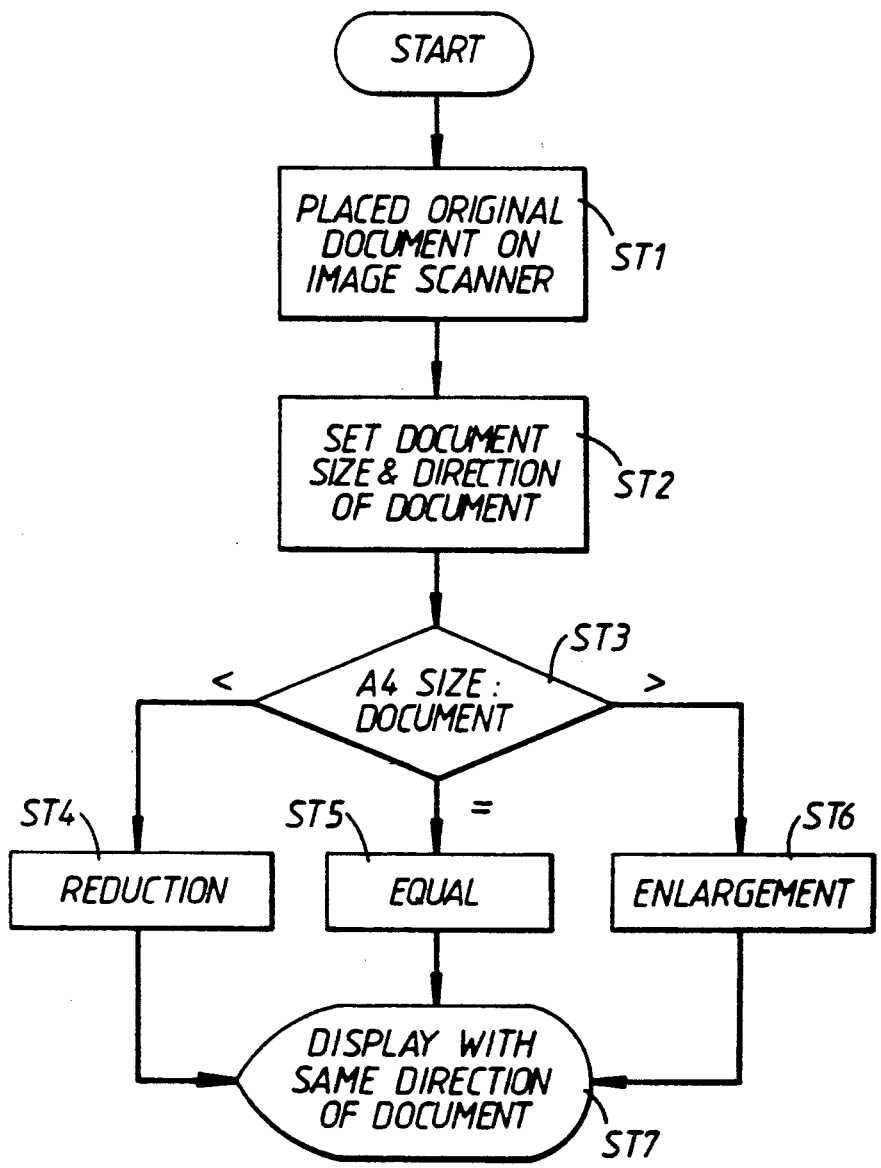
FIG. 5 is a flow-chart showing the operation of the present invention.

In the above embodiment, because the configuration of the display screen of display unit 77 is a square with 19-inch sides, the image information of an A4 size vertical original document can be displayed as enlarged vertical format image information with a magnification of 1, and the image information of an A4 size horizontal original document can be displayed as enlarged horizontal format image information with a magnification of 1. As shown in FIG. 5, image information are displayed on display unit 77 with enlarged size or reduced size according to the size of the original documents. That is, an operator places the original document on the original document table of image scanner 1 (ST1). The operator selectively presses original document size designator key 3m or 3n and vertical setting keV 3q or horizontal setting key 3r according to the information concerning the format of the size of the original document size and direction it is placed on the original document table (ST2). The information concerning the format of the original document is stored in main memory 51. CPU 11 judges the size of the original document and the direction information concerning the format from main memory 51. That is, the size of the original document is compared with the A4 size (ST3) If the size of the original document is larger than A4 size, the image information read by image scanner 1 is reduced by enlargement/reduction unit 91 (ST4). This reduced image information is displayed on display unit 77 via code/image conversion unit 71, display memory 73 and display controller 75 (ST7). The image information of both of the vertical original document and horizontal original document are displayed on display unit 77 with the same reduction ratio.

When the size of the original document is A4 size, the image information read by image scanner i is enlarged by enlargement/reduction unit 91 with a magnification of 1 (ST5). This enlarged image information is displayed on memory 73 and display controller 75 (ST7). The image information of both of the vertical original document and horizontal original document is displayed on display unit 77 with the same magnification ratio.

If the size of the original document is smaller than A4 size the image information read by image scanner 1 is enlarged by enlargement/reduction unit 91 with the prescribed magnification (ST6). This enlarged image information is displayed on display unit 77 via code/image conversion unit 71, display memory 73 and display controller 75 (ST7). The image information of both of the vertical original document and horizontal original document are displayed on display unit 77 with the same magnification ratio.

When the present invention is used as described above, image information in either a vertical or horizontal format can be displayed in the format of the original document, with same magnification ratio used for either format.

What is claimed is:

1. An information processing apparatus, comprising:
   first means for inputting image information;
   second means for inputting an indication of whether the image information, input by the first means, has either a vertical format with a width smaller than the vertical or a horizontal format with a width larger than the vertical length;
   third means for inputting a size value defined by the vertical length and the width of the image information;
   means, including a square screen having four equal sides, for displaying the input image information while maintaining the vertical or horizontal format of the image information input by the second means;
   means for comparing, before displaying the image information on the square screen, between a value of the vertical length corresponding to the size value input by the third means and a reference value corresponding to a length of the side of the square screen when the vertical format is input by the second means, and between a value of the width corresponding to the size value input by the third means and the reference value when the horizontal format is input by the second means; and
   means for modifying the size of the image information, before displaying the image information on the square screen, to reduce the size of the image information using a predetermined reduction ratio when the result of the comparison by the comparing means indicates that the value of the vertical length is larger than the reference value, or to enlarge the size of the image information using a predetermined magnification ratio when the result of the comparison by the comparing means indicates that the value of the width is smaller than the reference value, for both of the vertical and horizontal formats to display the input information within the square screen of the display means.

2. The apparatus of claim 1 wherein the first inputting means includes an image scanner having an original document table on which an original document is placed for scanning.

3. The apparatus of claim 2 wherein the first inputting means includes an automatic document feeder for feeding the original document to the original document table.

4. The apparatus of claim 1 wherein the second inputting means includes means for selectively designating whether an original document has the vertical or the horizontal format.

5. The apparatus of claim 1 wherein the third inputting means includes means for selectively designating the size of an original document.

* * * * *